(12) United States Patent
Tanaka

(10) Patent No.: US 8,860,848 B2
(45) Date of Patent: Oct. 14, 2014

(54) IMAGE PROCESSING APPARATUS AND METHOD

(71) Applicant: Fujifilm Corporation, Tokyo (JP)

(72) Inventor: Koichi Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/229,311

(22) Filed: Mar. 28, 2014

(65) Prior Publication Data

US 2014/0211034 A1 Jul. 31, 2014

Related U.S. Application Data

(63) Continuation of application No. PCT/JP2012/074335, filed on Sep. 24, 2012.

(30) Foreign Application Priority Data

Sep. 30, 2011 (JP) .................................. 2011-218566

(51) Int. Cl.
- H04N 5/262 (2006.01)
- H04N 5/217 (2011.01)
- G06K 9/40 (2006.01)
- H04N 5/232 (2006.01)

(52) U.S. Cl.
CPC ................................. H04N 5/23229 (2013.01)
USPC ............................ 348/239; 348/241; 382/264

(58) Field of Classification Search
CPC ... H04N 5/2226; H04N 5/2356; H04N 5/262; H04N 5/265; H04N 5/272
USPC ........ 348/222.1, 239, 241, 242; 382/260, 264
See application file for complete search history.

(56) References Cited

U.S. PATENT DOCUMENTS 6,785,415 B1   8/2004 Taguchi et al.
8,023,000 B2 *  9/2011 Tamaru ..................... 348/222.1

(Continued)

FOREIGN PATENT DOCUMENTS

EP    1 447 773 A2    8/2004
JP    10-283471 A    10/1998

(Continued)

OTHER PUBLICATIONS

International Search Report, issued in PCT/JP2012/074335, dated Oct. 23, 2012.
Written Opinion of the International Searching Authority, issued in PCT/JP2012/074335, dated Oct. 23, 2012.

*Primary Examiner* — Daniel M Pasiewicz
(74) *Attorney, Agent, or Firm* — Birch, Stewart, Kolasch & Birch, LLP

(57) ABSTRACT

When a blurring process is performed for an image, noise is reduced according to the characteristics of a blurring process filter in a target region of the blurring process. Accordingly, a difference occurs in noise amount with a non-target region of the blurring process. In view of such situations, an image processing apparatus according to an embodiment of the present invention adds noise to the blurring target region. Accordingly, the difference in noise amount can be reduced, and a blurring-emphasized image with a natural texture can be created. Furthermore, the image processing apparatus according to the embodiment of the present invention determines the noise amount according to the blurring amount by the blurring process filter while considering that, the larger the blurring amount is, the more greatly the noise is reduced by the blurring process, and adds the noise.

8 Claims, 15 Drawing Sheets

(56) References Cited

U.S. PATENT DOCUMENTS

| | | | |
|---|---|---|---|
| 8,149,290 B2* | 4/2012 | Watanabe | 348/222.1 |
| 8,184,171 B2* | 5/2012 | Tamaru | 348/218.1 |
| 8,212,895 B2* | 7/2012 | Nakamura | 348/239 |
| 2002/0080261 A1* | 6/2002 | Kitamura et al. | 348/349 |
| 2008/0259176 A1 | 10/2008 | Tamaru | |
| 2009/0109304 A1* | 4/2009 | Guan | 348/240.99 |
| 2010/0265353 A1* | 10/2010 | Koyama et al. | 348/222.1 |
| 2011/0037877 A1 | 2/2011 | Tamaru | |

FOREIGN PATENT DOCUMENTS

| | | |
|---|---|---|
| JP | 2002-197453 A | 7/2002 |
| JP | 2004-246625 A | 9/2004 |
| JP | 2007-241424 A | 9/2007 |
| JP | 2008-271240 A | 11/2008 |
| JP | 2011-41089 A | 2/2011 |

* cited by examiner

IMAGE PROCESSING APPARATUS AND METHOD

CROSS REFERENCE TO RELATED APPLICATIONS

This application is a Bypass Continuation of PCT International Application No. PCT/JP2012/074335 filed on Sep. 24, 2012, which claims priority under 35 U.S.C §119(a) to Patent Application No. 2011-218566 filed in Japan on Sep. 30, 2011, all of which are hereby expressly incorporated by reference into the present application.

BACKGROUND OF THE INVENTION

1. Field of the Invention

The present invention relates to an image processing apparatus and method, and particularly to a technology that creates a blurring-emphasized image.

2. Description of the Related Art

In fields of imaging apparatuses, such as digital cameras, and image processing apparatuses, corresponding point detection and image transformation are performed for images acquired by what is called focus bracket imaging, and blurring is performed for a prescribed image on the basis thereof, thus performing an image with a shallow depth of field. For instance, in Japanese Patent Application Laid-Open No. 2008-271240, the filter characteristics of a Gaussian filter to be applied to a reference image are calculated on the basis of focus bracketed images, and the reference image is locally smoothed on the basis of the characteristics, thereby creating a blurring-emphasized image. Japanese Patent Application Laid-Open No. 2007-241424 discloses that when a noise adding filter is applied to an image, a region which includes a person or the like and to which noise is not intended to be added is detected, a soft focus process is performed for the region, and a noise adding process is performed for regions other than the region concerned.

SUMMARY OF THE INVENTION

In the case where conventional technologies as in the patent literatures perform a blurring process on an image, a typical technique using a smoothing filter or the like unfortunately generates an uncomfortable image where the difference between noise amounts in blurred parts and the other parts occur to create unevenness. For instance, in the foregoing Japanese Patent Application Laid-Open No. 2008-271240, the difference between noise amounts in images that occurs owing to the blurring process is not considered. In Japanese Patent Application Laid-Open No. 2007-241424, noise is added to a specific region. Noise decreases according to filter characteristics in a soft focus process in a region which includes a person or the like and to which no noise is intended to be added, while noise is added to the other regions. Accordingly, a difference in noise unfortunately occurs in processed images, thus causing a problem.

The present invention has been made in view of such situations, and has an object to provide an image processing apparatus and method that reduce the difference between noise amounts of a blurred part and the other parts, and create a blurring-emphasized image with a natural texture.

In order to achieve the foregoing problem, an image processing apparatus according to a first aspect of the present invention includes: a reference image acquisition device which acquires a reference image of a subject; a blurring process device which applies a blurring process filter to a blurring target region in the acquired reference image; a noise amount determination device which determines a noise amount to be added to the blurring-processed blurring target region; and a noise addition device which adds the determined amount of noise to the blurring-processed blurring target region, wherein the noise amount determination device determines the noise amount according to a blurring amount by the blurring process filter, for the blurring target region, and the noise addition device adds the determined noise amount to the blurring target region.

When a blurring process is performed for an image as described above, noise is reduced according to the characteristics of a blurring process filter in a target region of the blurring process. Accordingly, a difference occurs in noise amount with a non-target region of the blurring process. An image processing apparatus according to a first embodiment of the present invention adds noise to the blurring target region. Accordingly, the difference in noise amount can be reduced, and a blurring-emphasized image with a natural texture can be created. Furthermore, the image processing apparatus according to the first embodiment of the present invention determines the noise amount according to the blurring amount by the blurring process filter while considering that, the larger the blurring amount is, the more greatly the noise is reduced by the blurring process, and adds the noise.

In the image processing apparatus according to the first aspect, the noise addition device may add noise to a pixel having a blurring amount in the blurring target region that is at least a threshold. As described above, in the image processing apparatus according to the first aspect, noise is added to the blurring target region. In order to perform such a process, it is effective to add noise while referring the blurring amount in the blurring target region, as with this aspect.

The image processing apparatus according to the first aspect may further include a distance image creation device which creates a distance image from the acquired reference image and an image other than the reference image. The blurring process filter may perform a blurring process with a blurring amount according to a subject distance acquired from the created distance image. For instance, it may be configured such that no blurring process is performed for a main subject, such as a person on the foreground, but the blurring amount can be set large on the background or the like with a large distance from the main subject. The blurring process is thus performed, thereby allowing a blurring-emphasized image with a natural texture to be acquired.

In the image processing apparatus according to the first aspect, the noise amount determination device may determine the noise amount according to imaging sensitivity of the reference image, and the noise addition device may add the determined noise amount according to the imaging sensitivity. Typically, if the imaging sensitivity is high, the noise amount is large. For instance, in the case of high sensitivity as with ISO 1600, a large amount of noise occurs. Accordingly, if a blurring process is performed for an image with such a large amount of noise, noise is reduced in a region to be blurring-processed while noise included in the original image unfortunately remains as it is in a region having not been subjected to the process, thereby causing noise unevenness in the image to be prominent. Thus, in the image processing method of this aspect, the problem is addressed by determining and adding noise of an amount according to the imaging sensitivity. The image processing apparatus of this aspect is significantly effective for such a case.

As described with a second aspect of the present invention, the image processing apparatus according to the first aspect may further include a noise extracting device which extracts noise from the acquired reference image. The noise amount determination device may determine the noise amount using the extracted noise, for the blurring target region. What noise is caused by the blurring process depends on noise included in an image to be subjected to the blurring process. Accordingly, as with this aspect, noise to be added to the blurring target region is calculated using noise extracted from the original reference image, thereby allowing noise with a natural texture to be added.

In the image processing apparatus according to the second aspect, the noise amount determination device may multiply the extracted noise by a coefficient according to the blurring amount by the blurring process filter to determine a noise amount for the blurring target region. As with this aspect, the extracted noise is multiplied by the coefficient, and the noise amount to be added to the blurring target region is adjusted, thereby allowing the difference in noise amount to be further reduced.

As described with a third aspect of the present invention, the image processing apparatus according to the first aspect may further include a noise amount estimation device which estimates the noise amount of the reference image from an imaging condition of the acquired reference image. The noise amount determination device may determine the noise amount for the blurring target region, using the estimated noise. As described above, what is extracted from the reference image may be used as noise to be added to the blurring-processed image. Alternatively, as with this aspect, noise estimated according to the model from an imaging condition of the reference image may be used.

In the image processing apparatus according to the third aspect, the noise amount determination device may multiply the estimated noise amount by a coefficient according to the blurring amount by the blurring process filter to determine the noise amount for the pixels of the blurring target region. As with this aspect, the estimated noise is multiplied by the coefficient, and the noise amount to be added to the blurring target region is adjusted, thereby allowing the difference in noise amount to be further reduced.

In the image processing apparatus according to the third aspect, the imaging condition may be a pixel value of the acquired reference image. Typically, the noise amount occurring in the image sensor depends on the amount of light received by a photodiode, i.e., the pixel value of the image. Accordingly, this aspect deals with the noise amount as a function of the pixel value.

In order to achieve the above object, an image processing apparatus according to a fourth aspect of the present invention includes: a reference image acquisition device which acquires a reference image of a subject; a flatness degree detection device which detects a flatness degree of the acquired reference image; a blurring amount setting device which sets a blurring amount in a blurring target region of the reference image according to the detected flatness degree; and a blurring process device which processes the blurring target region to be blurred with the set blurring amount.

The difference in noise amount caused by the blurring process is specifically visually prominent in a flat part. Thus, the image processing apparatus according to the fourth aspect sets the blurring amount according to the flatness degree. Accordingly, a blurring-emphasized image with a natural texture that has a uniform noise amount can be acquired.

The aforementioned image processing apparatus according to the third aspect does not add noise extracted from the reference image to the blurred image. Instead, this apparatus adds noise estimated on the basis of an imaging condition, and is thus different in this point from the image processing apparatus according to the second aspect, but is common with the image processing apparatuses according to the first to third aspects in separately adding some noise to the created blurred image. Unlike the image processing apparatuses according to the first to the third aspects, the image processing apparatus according to the fourth aspect of the present invention does not add noise itself, but sets a blurring amount instead so as to make noise uniform in a blurring-emphasized image generated as a result of the blurring process.

In the image processing apparatus according to the fourth aspect, the blurring amount setting device may multiply the blurring amount in a case where the flatness degree of the reference image is not considered by a coefficient according to the detected flatness degree to set the blurring amount. This aspect represents a specific aspect of setting the blurring amount according to the flatness degree.

The image processing apparatus according to the fourth aspect may further include: a noise amount determination device which determines a noise amount according to imaging sensitivity of the reference image; and a noise addition device which adds noise of the amount determined according to the imaging sensitivity.

In order to achieve the above object, an image processing apparatus according to a fifth aspect of the present invention includes: a reference image acquisition device which acquires a reference image of a subject; a blurring amount setting device which sets a blurring amount for the reference image; a blurred image creating device which applies a blurring process filter to the acquired reference image by the set blurring amount to generate a blurred image, the blurred image being created whose noise is reduced depending on characteristics of the blurring process filter; a difference calculation device which calculates a difference value between the acquired reference image and the generated blurred image, for the acquired reference image; and a combined image generation device which weights and adds the reference image and the blurred image, according to the calculated difference value, to generate a combined image.

The image processing apparatus according to this fifth aspect is also common with the fourth aspect in that noise is made to be uniform not by adding noise to the generated blurred image. However, unlike the fourth aspect, this fifth aspect weights and adds the reference image including a certain extent of noise and the blurred image having reduced noise, thereby allowing noise to be uniform in a combined image. In this case, the magnitude of the difference between the reference image and the blurred image device the magnitude of the blurring process and the flatness degree. Accordingly, in order to represent the difference between the noise amounts of both the images, the image processing apparatus according to the fifth aspect makes noise uniform in the combined image through addition with weighting according to the difference value. Accordingly, the image processing apparatus according to the fifth aspect can reduce the difference between noise amounts in blurred parts and the other parts, and create a blurring-emphasized image with a natural texture.

In the image processing apparatus according to the fifth aspect, if the calculated difference value is within a prescribed range, the combined image generation device may set a weight such that, the smaller the difference value is, the larger the weight on the reference image is and the smaller the weight on the blurred image is, and may set a weight such that, the larger the difference value is, the smaller the weight on the reference image is and the larger the weight on the blurred image is. A large magnitude of the difference value (the total value thereof) means the fact that blurring is largely emphasized by the blurring process (i.e., noise is largely reduced). Meanwhile, a small magnitude of the difference value (the absolute value thereof) means the fact that blurring is not emphasized or the degree of emphasis is small (i.e., noise is not reduced much or not reduced at all). The difference value is small also in a flat part. Accordingly, in a region with a small difference value, the weight on the reference image is set to be large, thereby allowing the combined image to include much noise. In contrast, in a region with a small difference value, the weight on the blurred image is set to be large, thereby allowing the noise amount included in the combined image to be suppressed. The noise amount is thus made to be uniform over the entire combined image.

Note that in the image processing apparatus according to the fifth aspect, the "prescribed range" of the difference value may be appropriately set according to the imaging condition, the characteristics of the imaging apparatus and the like. In the case where the difference value is out of the prescribed range, for instance in the case where the difference value is extremely small or extremely large, a constant value may be set irrespective of the difference value.

The image processing apparatuses according to the first to fifth aspects may include: a focus bracket imaging device which discretely moves the focus position by a predetermined movement amount and sequentially taking images to acquire a plurality of images; a corresponding point detection device which detects a corresponding point of the subject between the plurality of images taken by the focus bracket imaging device; and an image transformation device which transforms a plurality of images other than one reference image selected from a plurality of images with respect to a prescribed reference, such that the position of the corresponding point coincides. In this case, the reference image acquisition device may acquire the reference image of the subject from among the plurality of images acquired by the focus bracket imaging device.

Note that the image processing apparatuses according to the first to fifth aspects perform processes, such as determination of the noise amount, in units of regions. Alternatively, these processes may be performed in a unit of one pixel or in units of image blocks each including a plurality of pixels.

In order to achieve the object, a sixth aspect of the present invention provides an image processing method, including: a reference image acquisition step of acquiring a reference image of a subject; a blurring processing step of applying a blurring process filter to a blurring target region in the acquired reference image; a noise amount determination step of determining a noise amount to be added to the blurring-processed blurring target region; and a noise addition step of adding the determined amount of noise to the blurring-processed blurring target region, wherein the noise amount determination step determines the noise amount according to a blurring amount by the blurring process filter, for the blurring target region, and the noise addition step adds the determined noise amount to the blurring target region.

In the image processing method according to the sixth aspect, the noise addition step may add noise to a pixel having a blurring amount in the blurring target region that is at least a threshold.

The image processing method according to the sixth aspect may further include a distance image creation step of creating a distance image from the acquired reference image and an image other than the reference image. The blurring process filter may perform a blurring process with a blurring amount according to a subject distance acquired from the created distance image.

The image processing method according to the sixth aspect may further include a noise amount determination step of determining the noise amount according to imaging sensitivity of the reference image; and a noise addition step of adding noise of the amount determined according to the imaging sensitivity.

As described with a seventh aspect of the present invention, the image processing method according to the sixth aspect may further include a noise extraction step of extracting noise from the acquired reference image. The noise amount determination step may determine the noise amount using the extracted noise, for the blurring target region.

In the image processing method according to the seventh aspect, the noise amount determination step may multiply the extracted noise by a coefficient according to the blurring amount by the blurring process filter to determine a noise amount for the blurring target region.

As described with an eighth aspect of the present invention, the image processing method according to the sixth aspect may further include a noise amount estimation step of estimating the noise amount of the reference image from an imaging condition of the acquired reference image. The noise amount determination step may determine the noise amount for the blurring target region, using the estimated noise.

In the image processing method according to the eighth aspect, the noise amount determination step may multiply the estimated noise amount by a coefficient according to the blurring amount by the blurring process filter to determine the noise amount for the blurring target region.

In the image processing method according to the eighth aspect, the imaging condition may be a pixel value of the acquired reference image.

The aforementioned image processing methods according to the sixth to eighth aspects correspond to the aforementioned image processing apparatuses according to the first to third aspects. As with the image processing apparatuses according to the first to third aspects, the difference in noise amount of the blurring-processed image can be reduced by adding noise to the blurring target region, and a blurring-emphasized image with a natural texture can be created.

In order to achieve the above object, a ninth aspect of the present invention provides an image processing method, including: a reference image acquisition step of acquiring a reference image of a subject; a flatness degree detection step of detecting a flatness degree of the acquired reference image; a blurring amount setting step of setting a blurring amount in a blurring target region of the reference image according to the detected flatness degree; and a blurring processing step of processing the blurring target region to be blurred with the set blurring amount.

The image processing method according to the ninth aspect of the present invention corresponds to the aforementioned image processing apparatus according to the fourth aspect. As with the image processing apparatus according to the fourth aspect, the blurring amount is set according to the flatness degree of each pixel of the reference image.

In the image processing method according to the ninth aspect, the blurring amount setting step may multiply the blurring amount in a case where the flatness degree of the reference image is not considered by a coefficient according to the detected flatness degree to set the blurring amount.

The image processing method according to the ninth aspect may further include a noise amount determination step of determining a noise amount according to imaging sensitivity of the reference image; and a noise addition step of adding noise of the amount determined according to the imaging sensitivity.

In order to achieve the above object, a tenth aspect of the present invention provides an image processing method, including: a reference image acquisition step of acquiring a reference image of a subject; a blurring amount setting step of setting a blurring amount for the reference image; a blurred image creating step of applying a blurring process filter to the acquired reference image by the set blurring amount to generate a blurred image, the blurred image being created whose noise is reduced depending on characteristics of the blurring process filter; a difference calculation step of calculating a difference value between the acquired reference image and the generated blurred image, for the acquired reference image; and a combined image generation step of weighting and adding the reference image and the blurred image, according to the calculated difference value, to generate a combined image.

The image processing method according to the tenth aspect of the present invention corresponds to the aforementioned image processing apparatus according to the fifth aspect. As with the image processing apparatus according to the fifth aspect, noise is made to be uniform in the combined image by weighting and adding the reference image and the blurred image with reduced noise. Accordingly, the difference between noise amounts in blurred parts and the other parts can be reduced, and a blurring-emphasized image with a natural texture can be created.

In the image processing method according to the tenth aspect, if the calculated difference value is within a prescribed range, the combined image generation step may set a weight such that, the smaller the difference value is, the larger the weight on the reference image is and the smaller the weight on the blurred image is, and may set a weight such that, the larger the difference value is, the smaller the weight on the reference image is and the larger the weight on the blurred image is.

The image processing method according to the tenth aspect may further include: a noise amount determination step of determining a noise amount according to image sensitivity of the reference image; and a noise addition step of adding noise of the amount determined according to the imaging sensitivity.

As with the image processing apparatuses according to the first to fifth aspects, the image processing methods according to the sixth to tenth aspects may include: a focus bracket imaging step; a corresponding point detection step; and an image transformation step.

The image processing methods according to the sixth to tenth aspects performs processes, such as determination of the noise amount, in units of regions. Alternatively, these processes may be performed in a unit of one pixel or in units of image blocks each including a plurality of pixels.

In order to achieve the above object, an image processing program according to an eleventh aspect of the present invention causes an image processing apparatus to execute the image processing method according to any of the sixth to tenth aspects. The image processing program according to the eleventh aspect may be embedded in an imaging apparatus, such as a digital camera. Alternatively, the program may be used as image processing and editing software in a personal computer (PC) or the like. Furthermore, a recording medium according to a twelfth aspect of the present invention has recorded therein computer-readable code of a program causing an image processing apparatus to execute the image processing method according to any of the sixth to tenth aspects. Not only ROM or RAM of a digital camera or a PC but also CD, DVD, BD, HDD, a non-transitory semiconductor recording medium, such as SSD or various memory cards, or a magneto-optical recording medium may be adopted as an example of the recording medium of the twelfth aspect.

As described above, the image processing apparatus and method and program according to the present invention can reduce the difference between noise amounts in a blurred part and the other parts and create a blurring-emphasized image with a natural texture.

DETAILED DESCRIPTION OF THE EMBODIMENTS

Embodiments for implementing an image processing apparatus and method and program according to the present invention are hereinafter described in detail with reference to the accompanying diagrams.

Configuration of Imaging Apparatus

Figure 1:
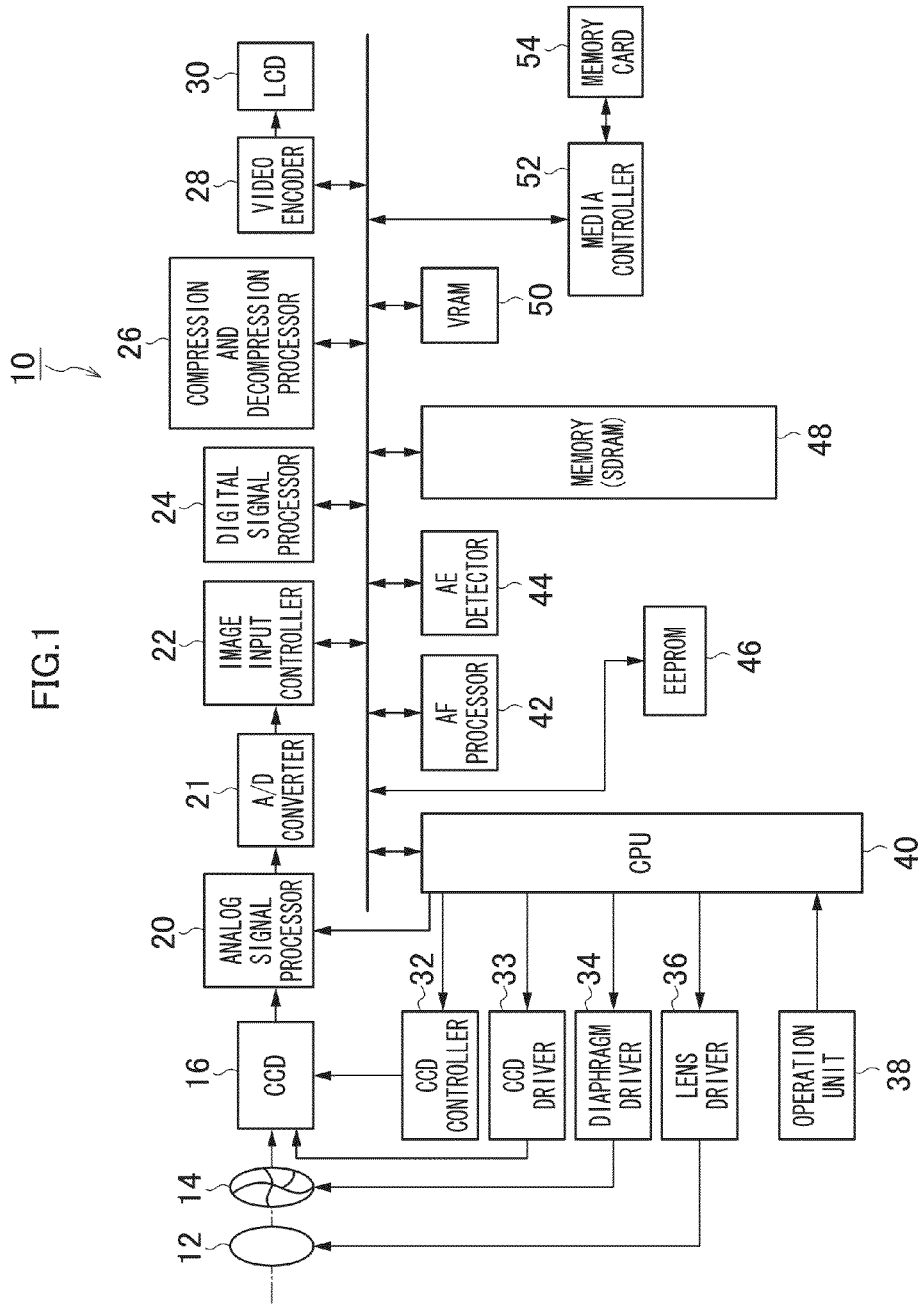
FIG. 1 is a block diagram showing a configuration of an imaging apparatus 10 according to a first embodiment of the present invention.

FIG. 1 is a block diagram showing an embodiment of an imaging apparatus 10 according to a first embodiment of the present invention. The operation of the entire imaging apparatus 10 is integrally controlled by a central processing unit (CPU) 40. A program (including a program used for an aftermentioned blurring process or noise adding process) and parameters that are required for the operation of the CPU 40 are stored in EEPROM (electronically erasable and programmable read only memory) 46.

The imaging apparatus 10 is provided with an operation unit 38, such as a shutter release button, a mode dial, a playback button, a MENU/OK key, an arrow key, a BACK key and the like. A signal from the operation unit 38 is input into the CPU 40. As described later, the CPU 40 controls each circuit in the imaging apparatus 10 on the basis of the input signal.

The shutter release button is an operation button through which an instruction for starting imaging is issued, and includes a two-step stroke switch that has an S1 switch that is turned on when halfway pressed, and an S2 switch that is turned on when fully pressed. The mode dial is means for selecting a still/moving imaging mode, a manual/auto imaging mode, and an imaging scene and the like. Furthermore, imaging sensitivity (e.g., ISO100, 400, 800, 1600, etc.) can be set.

The playback button is a button for switching a mode to a playback mode for displaying, on a liquid crystal monitor 30, a still image or a moving image which has been taken and recorded. The MENU/OK key has both a function of issuing an instruction for displaying a menu on a screen of the liquid crystal monitor 30 and a function of issuing an instruction for determining and executing the selection. The arrow key is an operation unit for inputting an instruction in four directions, which are vertical and horizontal directions, and functions as cursor movement operation means, a zoom switch, a frame advance button during a playback mode and the like. The BACK key is used for deleting a desired object, such as a selected item, cancelling an instructed detail, or going back to a previous operation state. These buttons and keys can be used for operations required for the blurring process and the noise adding process, such as the case where a user designates a blurring degree.

In an imaging mode, image light representing a subject is image-formed on a light receiving surface of a solid image pickup element (hereinafter, referred to as "CCD") 16 via an imaging lens 12 and a diaphragm 14. The imaging lens 12 includes a focusing lens and a zoom lens, is driven by a lens driver 36 controlled by the CPU 40, and subjected to focus control, zoom control and the like.

The lens driver 36 moves the focusing lens in the optical axis direction according to an instruction from the CPU 40 to change a focus position. The lens driver 36 moves forward and backward the zoom lens in the optical axis direction according to an instruction from the CPU 40 to change the focal length.

The CPU 40 controls the diaphragm 14 through a diaphragm driver 34, controls charge storage time (shutter speed) in the CCD 16 through a CCD controller 32, and performs control for reading an image signal from the CCD 16. The signal charge stored in the CCD 16 is read as a voltage signal according to the signal charge on the basis of a reading signal applied by the CCD controller 32, and applied to an analog signal processor 20.

The analog signal processor 20 sample-holds R, G and B signals from each pixel for voltage signals output from the CCD 16 according to a correlated double sampling process, amplifies the signals and then adds the signals to an A/D converter 21. The A/D converter 21 converts sequentially input analog R, G and B signals into digital R, G and B signals, and outputs the signals to an image input controller 22.

The digital signal processor 24 performs prescribed signal processing, such as a gain control process, a Gamma correction process, a YC processing, including an offset process, white balance correction and sensitivity correction, for the digital image signal input via the image input controller 22.

The image data processed by the digital signal processor 24 is input into a VRAM 50. The VRAM 50 includes an A region and a B region each of which store image data representing one frame of an image. The image data representing one frame is alternatively rewritten between the A region and the B region. The written image data is read from a region other than a region in which image data is being written. The image data read from the VRAM 50 is encoded by a video encoder 28, and output to the liquid crystal monitor 30, thereby allowing a subject image to be displayed on the liquid crystal monitor 30.

Upon first stage pressing (half pressing) of the shutter release button of the operation unit 38, the CPU 40 starts an AF operation and an AE operation, and performs auto-focus control for the imaging lens 12 via the lens driver 36. Image data output from the A/D converter 21 upon half pressing of the shutter release button is captured by an AE detector 44.

The CPU 40 calculates the brightness of a subject (imaging Ev value) from the integrated value of the G signal from the AE detector 44, determines an aperture value of the diaphragm 14 and an electronic shutter (shutter speed) of the CCD 16 on the basis of the imaging Ev value, and controls the diaphragm 14 and charge storage time of the CCD 16 on the basis of the result.

The AF processor 42 is a section for performing a contrast AF process and a phase AF process. In the case of performing the contrast AF process, the focusing lens in the imaging lens 12 is controlled so as to maximize an AF evaluation value that has been calculated by integrating a high frequency component of the image data in a prescribed focus region and represents a focus state. In the case of performing a phase difference AF process, the focusing lens in the imaging lens 12 is controlled such that the defocus amount acquired from the phase difference between the pieces of image data of a main pixel and a sub-pixel in the prescribed focus region in the image data becomes zero.

When the AE operation and the AF operation finish and then second stage pressing (full pressing) is preformed, the image data output from the A/D converter 21 is input from the image input controller 22 into a memory (SDRAM) 48 in response to the pressing, and temporarily stored therein.

After the data is temporarily stored in the memory 48, an image file is generated through signal processing, such as YC processing, in the digital signal processor 24 and a compression process and the like in a compression and decompression processor 26 into the JPEG (joint photographic experts group) format and the like. The image file is read by a media controller 52 and recorded in a memory card 54. The image recorded in the memory card 54 can be played back and displayed on the liquid crystal monitor 30 through operation on the playback button of the operation unit 38.

Image Processing of Present Invention

First Embodiment

Figure 2:
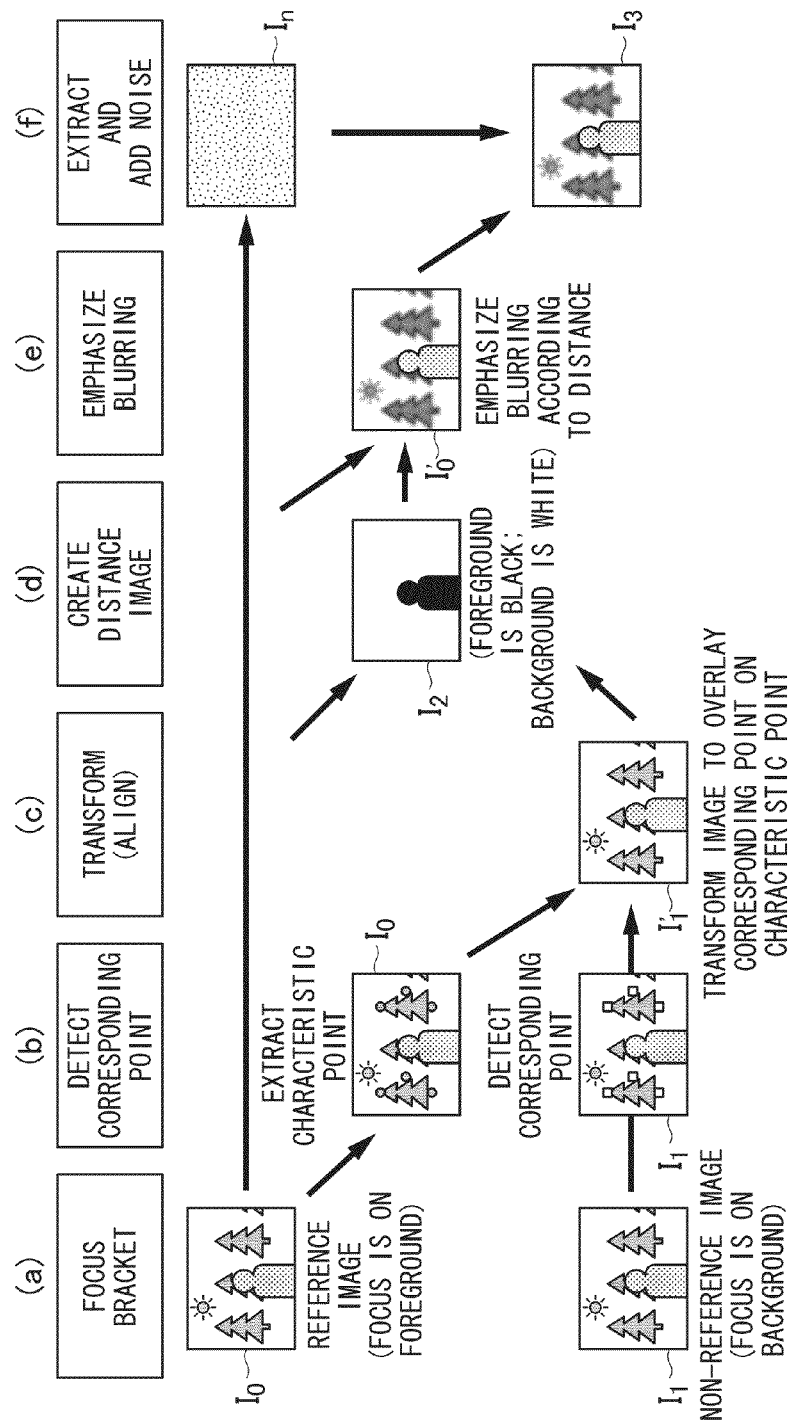
FIG. 2 is a schematic diagram showing an overview of image processing according to the first embodiment of the present invention.
Figure 3:
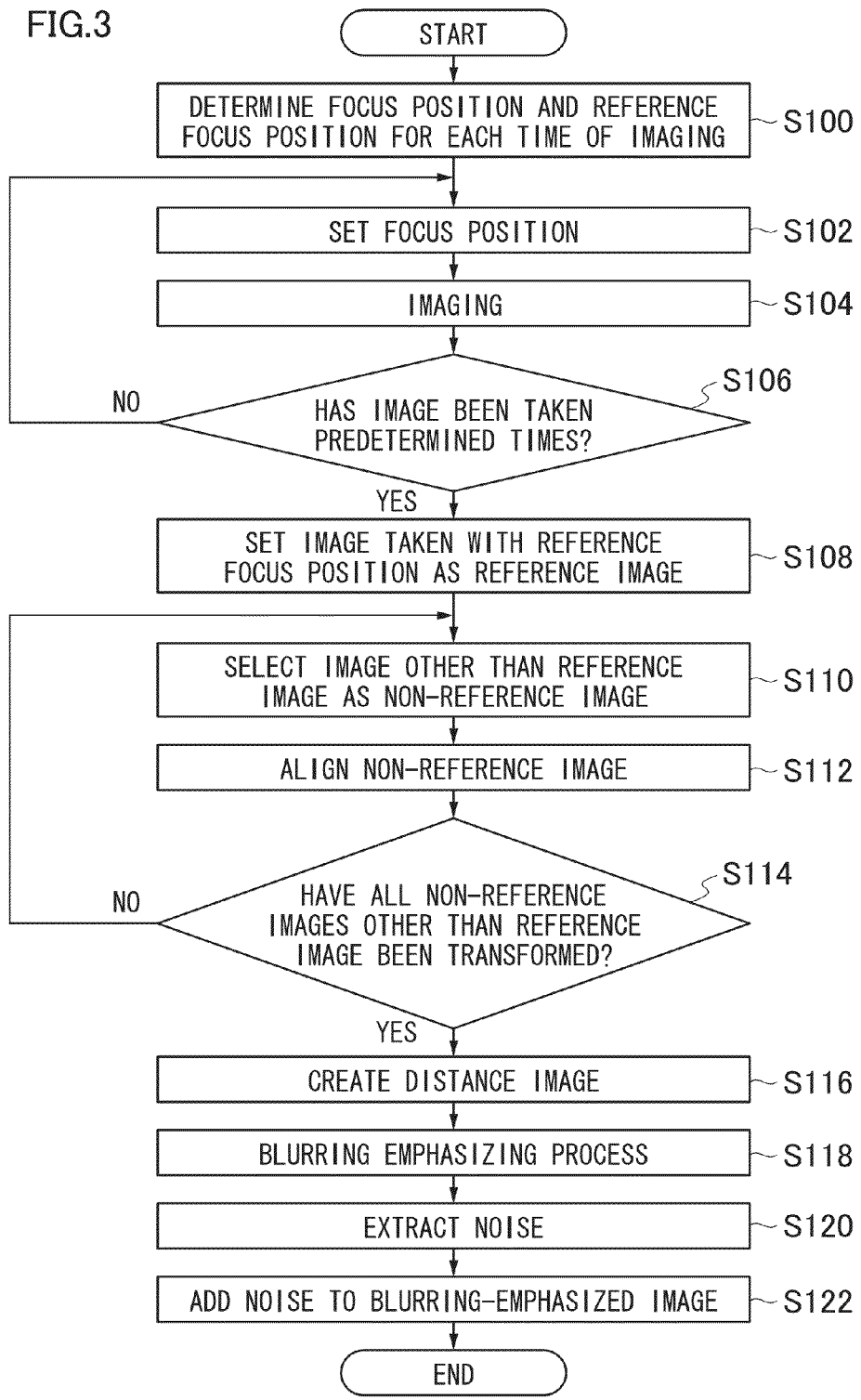
FIG. 3 is a flowchart showing procedures of the image processing according to the first embodiment of the present invention.

Next, image processing according to a first embodiment of the present invention is described. FIG. 2 is a schematic diagram showing a first embodiment of image processing according to the present invention. Here, as with an example of FIG. 2, a case where a person stands against the background and a blurring process is performed on the background is considered. FIG. 3 is a flowchart showing image processing procedures in such a case. The procedures shown in FIG. 3 are roughly divided into five stages that includes: (1) focus bracket imaging (up to S106; FIG. 2(A)); (2) create distance image (up to S116; FIG. 2(B) to (D)); (3) blurring process based on distance image (up to S118; FIG. 2(E)); (4) extract noise (S120; FIG. 2(F)); and (5) add noise (S122; FIG. 2(F)). Processes in the respective stages are hereinafter described.

(1) Focus Bracket Imaging

When the process is started, in S100, a focus position and a reference focus position for each of prescribed times of imaging included in focus bracket imaging are determined. In S102, the CPU 40 moves the lens 12 to focus on a first focus position. In S104, an image is taken. If the times of imaging does not reach the prescribed times (no in S106), the processing returns to S102 and the lens 12 is moved to focus on the next focus position, and repeats imaging. If the times of imaging reaches the prescribed times (yes in S106), the processing proceeds to S108 to create a distance image.

(2) Create Distance Image

In S108, an image taken at the reference focus position determined in S100 among a plurality of images acquired by imaging up to S106 is set as a reference image $I_0$. Next, the processing proceeds to S110, an image other than the reference image $I_0$ is selected as a non-reference image $I_1$. In S112, the non-reference image $I_1$ is aligned. Such alignment is performed because there may be a case where imaging timing is slightly different among images taken by focus bracketing to cause deviation in angle of view. The alignment is performed by first extracting a feature point of the reference image $I_0$, detecting a corresponding point that corresponds to the feature point in the non-reference image $I_1$, and transforming the non-reference image $I_1$ such that the corresponding point is overlaid on the feature point to thereby create a transformed image $I_1'$. This process is performed for all of the non-reference images $I_1$ (during no in S114) and the alignment is finished (yes in S114), the processing proceeds to S116 and a distance image $I_2$ is created from the reference image $I_0$ and the transformed image $I_1'$.

The distance image $I_2$ can be generated by various techniques. For instance, a method disclosed in Japanese Patent Application Laid-Open No. 2010-20758 can be used. More specifically, as described as a first embodiment in Japanese Patent Application Laid-Open No. 2010-20758, the sharpness of each of a plurality of pixels of a plurality of images on the basis of which a distance image is created is calculated, a first reference value that indicates an image with the highest sharpness among the plurality of images is calculated for each pixel, the calculated first reference value is spatially smoothed on the basis of the first reference values of pixels therearound to calculate a second reference value, and an image processing is performed for at least one of the plurality of images on the basis of the calculated second reference value, thereby allowing connections between the second reference values which represent a focus distribution to be smoothed. Accordingly, a map of the second reference values, that is, a distance image can be acquired. As described as a second embodiment in Japanese Patent Application Laid-Open No. 2010-20758, the first reference value is not represented as a scalar value that is an image number with the highest sharpness. Instead, the first reference value may be represented as a two-dimensional vector (sharpness vector) in which the sharpness is additionally provided with the scalar value, and smoothing may be performed in consideration of the magnitude of the sharpness, thereby acquiring a map of the second reference values, that is, a distance image.

In the schematic diagram of FIG. 2(D), the distance image $I_2$ is represented in two colors, i.e., black (foreground) and white (background). However, the distance image $I_2$ is not necessarily limited to a binary image.

(3) Blurring Process

In S118, on the basis of the distance information included in the distance image $I_2$ created up to S116, a blurring process is performed for the reference image $I_0$. Various filters can be used for the blurring process. Here, a Gaussian filter represented by the following Expression 1 is used.

$$f(x)=(2\pi\sigma^2)^{-1/2}\times\exp(-x^2/(2\sigma^2)) \qquad \text{[Expression 1]}$$

In the above expression, σ represents a blurring-emphasized degree due to the blurring process. The lower the σ is, the lower the blurring-emphasized degree is. The higher the σ is, the higher the blurring-emphasized degree is. Various sizes of kernels, i.e., 3×3, 5×5, etc. can be used for applying the Gaussian filter. Such a Gaussian filter is applied, and the blurring process is performed for the reference image $I_0$ on the basis of the distance information to generate blurred image $I_0'$. For instance, on a pixel with a small distance, σ of the Gaussian filter is set small, thereby allowing the blurring-emphasized degree to be small. On a pixel with a large distance, σ is set large, thereby allowing the blurring-emphasized degree to be large.

Figure 5:
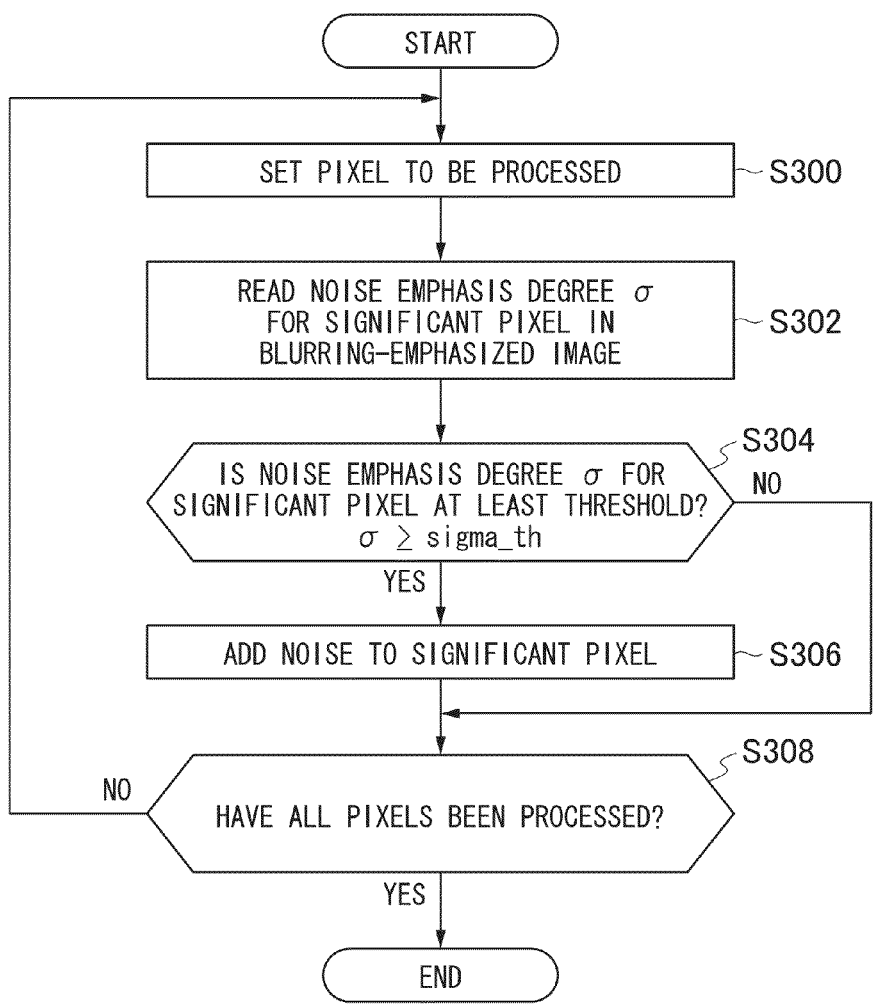
FIG. 5 is a flowchart showing an example of a noise adding process.

Note that in the blurring process, which part in the image is blurred to which extent is recorded as blurring information, and then used in an after-mentioned case of adding noise (S122 in FIG. 3 and S300 to S308 in FIG. 5). The blurring information indicates which degree of strength of blurring amount is applied to each pixel. Provided that the blurring process is performed using the Gaussian filter represented by the foregoing expression, a in the expression may be regarded as the blurring degree. The σ is recorded as blurring information for each pixel.

The processes up to S118 blur the background part of the reference image $I_0$ according to the characteristics of the filter used for the blurring process (the magnitude of σ of the Gaussian filter in the above example). In the background part, noise included in the original reference image $I_0$ is reduced owing to the blurring process. In contrast, noise in a region of a person to which no blurring process is performed (or with a weak degree of the blurring process) is not reduced. In order to reduce the difference in noise between in a region where the blurring process is performed and in a region where the blurring process is not performed, the following noise extraction and noise addition are performed in the image processing of the present invention.

(4) Extract Noise

In S120, a noise component is extracted from the reference image $I_0$ (an image to be subjected to the blurring process). The extraction of the noise component can be performed by any of various methods. For instance, a technique shown in a flowchart of FIG. 4. According to an example of FIG. 4, in S200, a smoothed image acquired by applying a smoothing filter to the reference image $I_0$ is generated. In S202, the difference between the reference image $I_0$ and the smoothed image is acquired to extract a high frequency component of the reference image $I_0$. In order to extract a noise component from the high frequency component, what has a small value among the high frequency components may be determined as noise, in consideration that the high frequency component includes not only noise but also an actual signal. In this embodiment, edge detection is performed (S204) for the high frequency component, and noise is extracted (a noise image is created: S206) on the basis of the result thereof (S204).

More specifically, a HPF (high-pass filter) is applied to a significant pixel of a high frequency image including a high frequency component in a horizontal direction, a vertical direction, an obliquely upper right direction, and an obliquely upper left direction. For instance, a [−1: 2: −1] one-dimensional filter is used. What has the highest value among the absolute values Hh, Hv, Hne and Hnw of output values of the HPF in the respective directions is regarded as Hmax.

The magnitude of the Hmax represents an edge degree (how each pixel is close to an edge). This Hmax and a threshold hpf_th1 are compared with each other, and, (A) if Hmax>hpf_th1, the significant pixel is determined to belong to an edge part, and, (B) if Hmax<hpf_th1, the significant pixel is determined as noise, and a noise image $I_n$ having the same size as the reference image $I_0$ is generated.

(5) Add Noise

Figure 4:
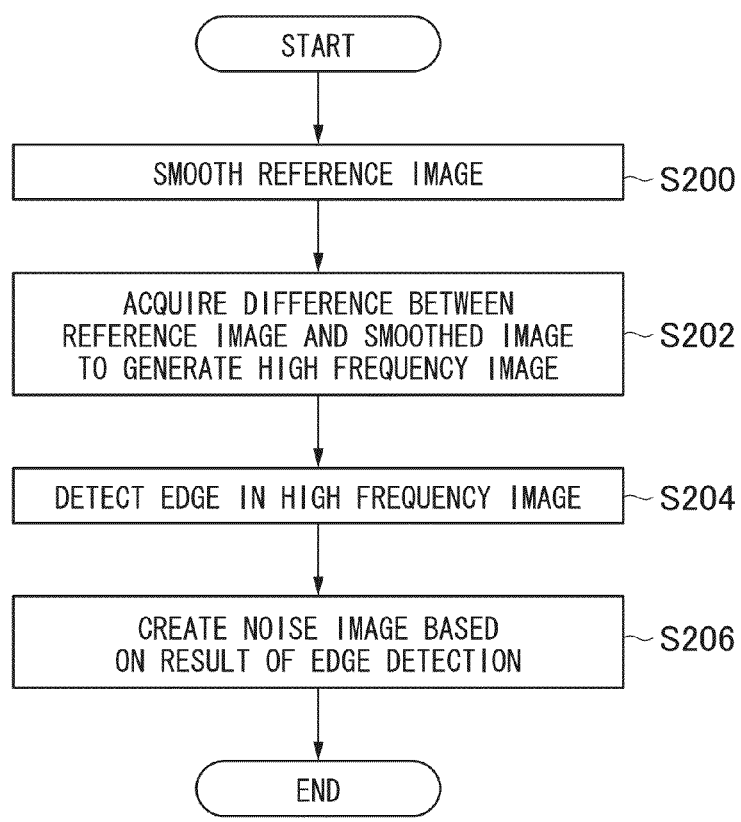
FIG. 4 is a flowchart showing an example of a noise extracting process.

After the process shown in the example of FIG. 4 generates the noise image $I_n$, a process of adding the generated noise to the blurred image $I_0'$ is performed in S122 of FIG. 3. In this case, it is required to add noise only to a region having been blurred by the blurring process. Thus, noise is added on the basis of the blurring information (σ of the Gaussian filter) recorded in the blurring process (S118 in FIG. 3).

Details of the noise adding process in S122 is shown in a flowchart of FIG. 5. First, in S300, a pixel to be processed (significant pixel) in the blurred image $I_0'$ is set. In S302, the noise emphasis degree a for the significant pixel in the blurred image $I_0'$ is read from the blurring information recorded during the blurring process. If the read σ is at least threshold sigma_th (yes in S304), noise is reduced at the pixel at the same time when the blurring process is performed. Accordingly, the processing proceeds to S306, and the value of a corresponding pixel (i.e., the noise amount) in the generated noise image is added to the significant pixel. The processing proceeds to S308. If a read in S302 is less than the threshold sigma_th (no in S304), no noise is added and the processing proceeds to S306. Another pixel is set as the significant pixel, and these processes are repeated (during no in S308). If all the pixels have been processed (yes in S308), the noise adding process is finished. Thus, a noise-added image $I_3$ is acquired.

Figure 6:
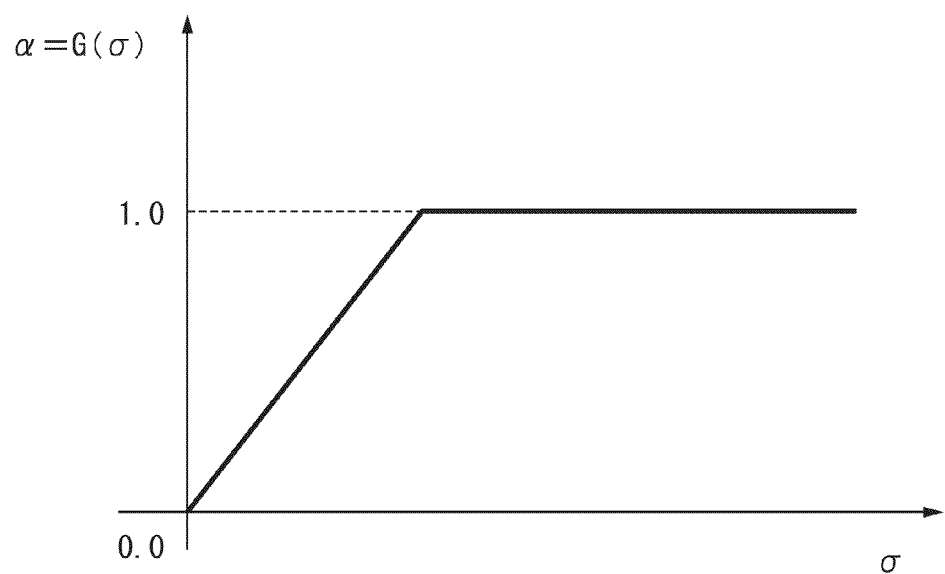
FIG. 6 is a diagram showing an example of a relationship between a blurring degree and a coefficient for noise.

During addition of noise, it is preferred that the amount of noise to be added can be changed according to the read value of σ. For instance, provided that the pixel value of the significant pixel is p and the noise amount is n, as with (p+α×n), noise n is multiplied by a coefficient α (=G(σ)) (α=0.0 to 1.0) dependent on a to acquire a pixel value. An example of a relationship between σ and α is shown in FIG. 6.

In the image processing, it is preferred that the noise amount to be added to the blurred image be adjusted according to the imaging sensitivity set by the mode setting dial.

As described above, in the first embodiment, the noise extracted from the reference image $I_0$ is added to the blurring process region in the blurred image $I_0'$ according to the strength σ of the blurring process. Accordingly, the difference between noise amounts in the region where the blurring process is performed and the region where the blurring process is not performed is reduced, thereby allowing a blurring-emphasized image with a natural texture to be created.

Second Embodiment

Figure 7:
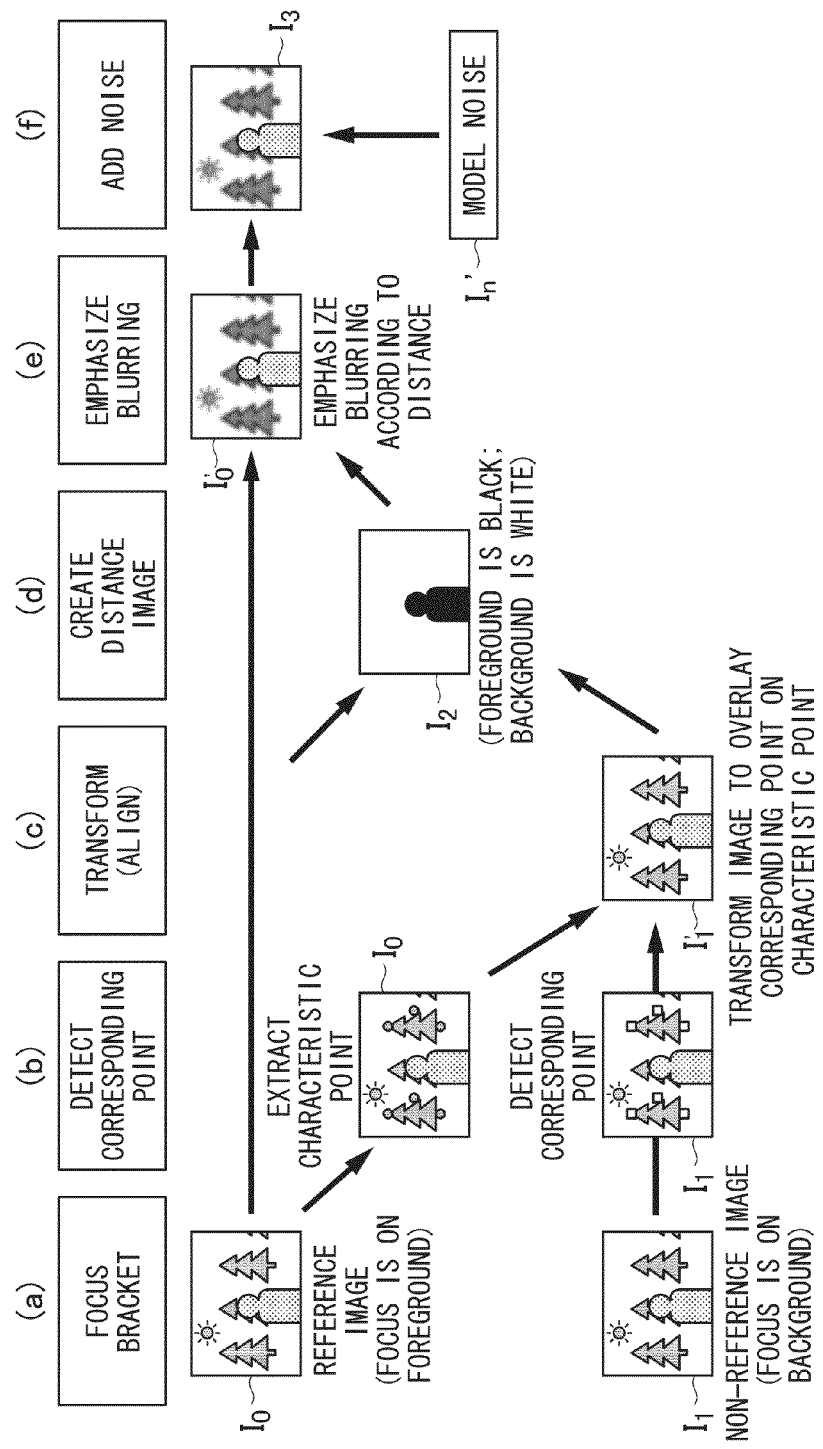
FIG. 7 is a schematic diagram showing an overview of image processing according to a second embodiment of the present invention.
Figure 8:
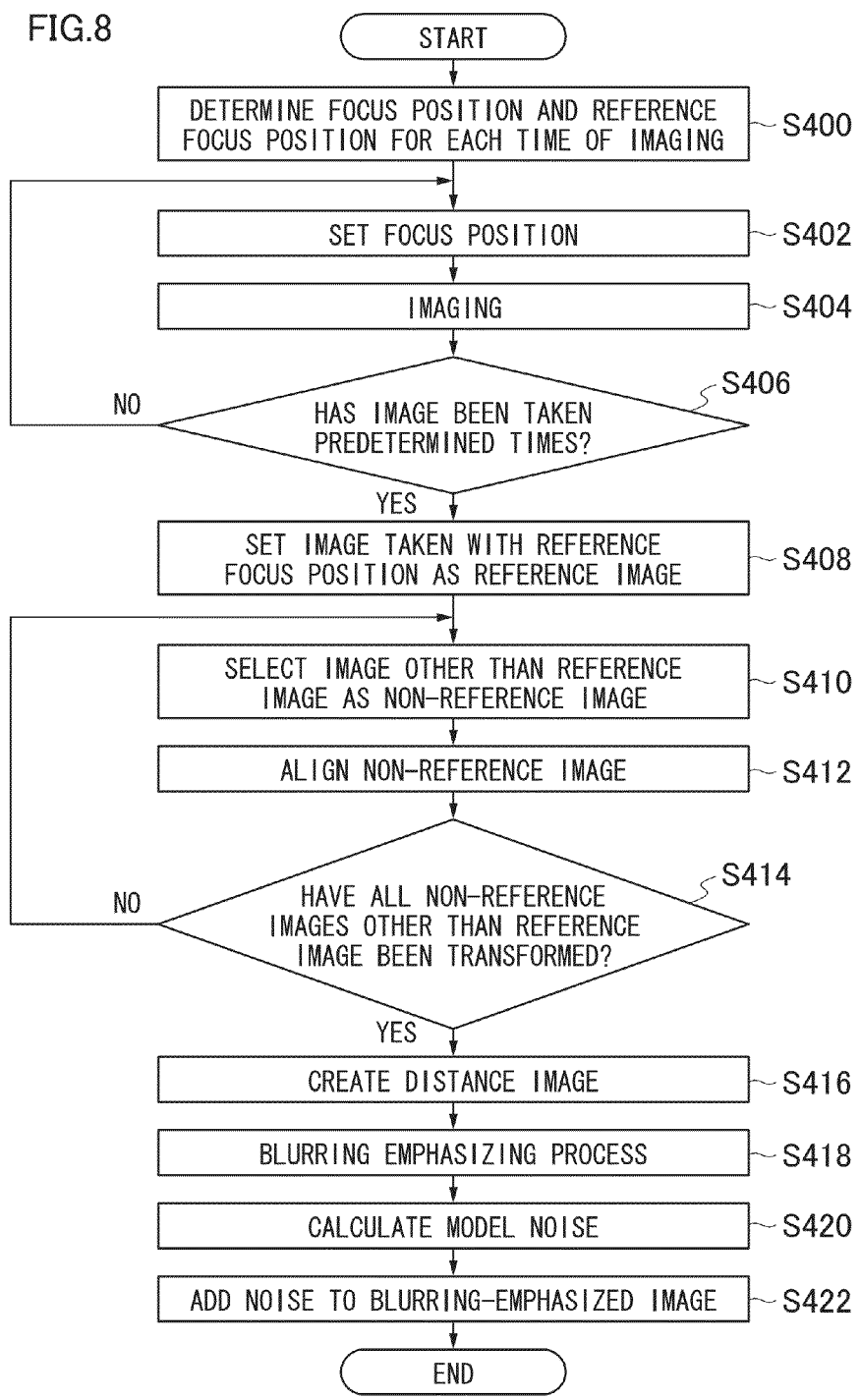
FIG. 8 is a flowchart showing procedures of the image processing according to the second embodiment of the present invention.

Next, image processing according to a second embodiment is described. FIG. 7 is a schematic diagram showing the second embodiment of image processing according to the present invention. As with the example in FIG. 2, a case is considered where a person stands against the background and a blurring process is performed on the background. FIG. 8 is a flowchart showing an image processing procedure in such a case. Among the procedures of image processing shown in FIG. 8, the focus bracket imaging (S402, S404, S406; FIG. 7(A)), the creation of the distance image (S408, S410, S412, S414, S416; FIG. 7(B) to (D)), and the blurring process based on the distance image (up to S418; FIG. 7(E)) are analogous to the processes in the foregoing flowchart of FIG. 3 with which the first embodiment has been described. Accordingly, the description thereof is omitted. Hereinafter, model noise calculation (S420; FIG. 7(F)) and a process of noise addition (S422; FIG. 7(F)) are described in detail. In the first embodiment, noise is extracted from the reference image, and the noise is added to the blurred image. However, in this second embodiment, noise extraction is not performed. Instead, the noise amount is estimated from a noise propagation model in the imaging apparatus 10, and added to the blurred image.

(1) Model Noise Calculation

Also in the second embodiment, as with the first embodiment, if the σ of the significant pixel in the blurred image is at least the threshold sigma_th, it is considered that the blurring process is performed there and noise is reduced at the same time. If this condition is satisfied, noise n may be added to the value p of the significant pixel.

In this second embodiment, the noise amount n is estimated from the noise occurrence and propagation model in the imaging apparatus 10. Typically, the noise amount occurring in an image sensor, such as CCD, depends on the amount of light reception in a photodiode. Since the amount of light reception in the photodiode is a pixel value of an image, the noise amount n is regarded as a function (n(v)) of the pixel value v in the reference image $I_0$. The characteristics of the noise occurring in the image sensor, such as CCD, are changed each time when being subjected to each pieces of various signal processing described in the section of "Configuration of Imaging Apparatus". Accordingly, it is regarded that the noise amount n(v) for the pixel value v becomes n'(v) after the signal processing.

The noise amount n'(v) thus estimated from the pixel value of the reference image $I_0$ is added to the significant pixel p of the blurred image $I_0'$ to create the noise-added image $I_3$. Here, it is preferred that the noise n be multiplied by the coefficient α (=G(σ)) (α=0.0 to 1.0) depending on σ, such as (p+α×n), to acquire a pixel value.

(2) Add Noise

Figure 9:
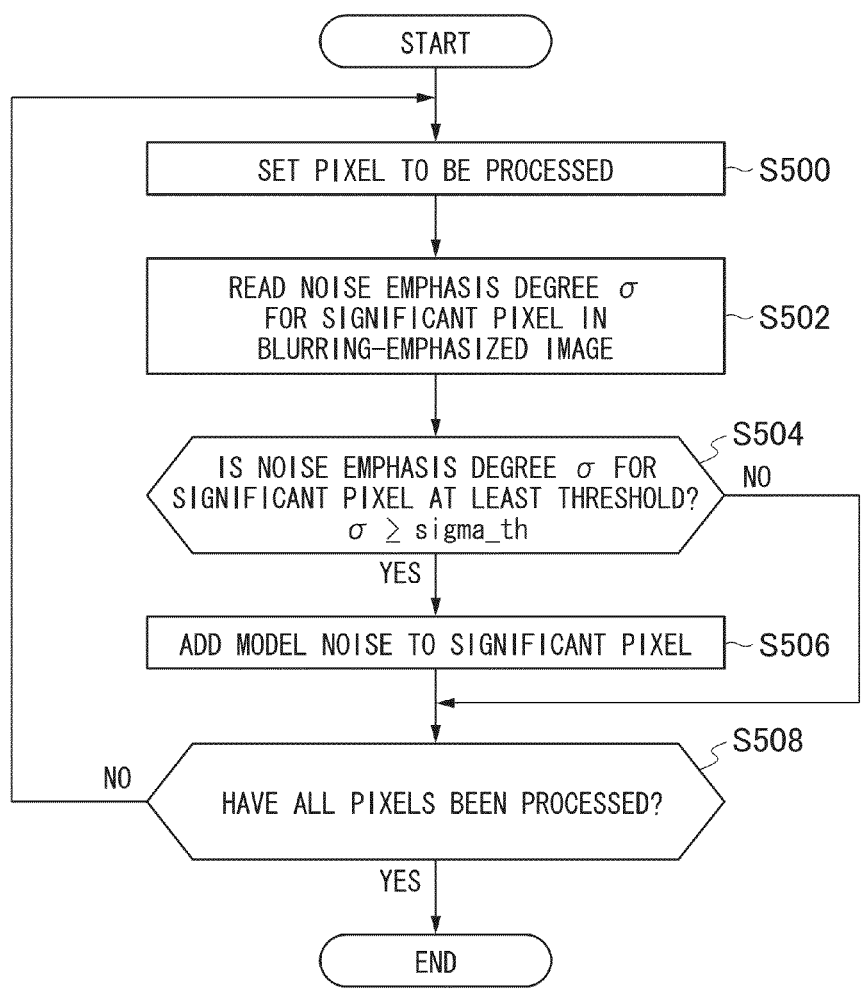
FIG. 9 is a flowchart showing an example of adding noise on the basis of a noise model.

After the noise image $I_n'$ is generated by the processes up to S420, a process of adding the generated noise to the blurred image $I_0'$ in S422 of FIG. 8 is performed. This process is shown in a flowchart of FIG. 9. Processes of S500 to S504 and S508 in the flowchart of FIG. 9 are analogous to S300 to S304 and S308 of the flowchart shown in FIG. 5. Accordingly, the detailed description is omitted. If it is determined that σ is at least the threshold sigma_th in the steps up to S504, the processing proceeds to S506 and the noise estimated from the model is added to the significant pixel and then the processing proceeds to S508. If a read in S502 is less than the threshold sigma_th (no in S504), no noise is added and the processing proceeds to S506. Another pixel is set to the significant pixel and these processes are repeated (during no in S508). If all the pixels have been processed (yes in S508), the noise adding process is finished. Thus, the noise-added image $I_3$ is acquired.

In the foregoing second embodiment, noise is estimated on the basis of the model and the noise is added, which can reduce the difference between the noise amount due to the blurring process as with the first embodiment, and create a blurring-emphasized image with a natural texture. Furthermore, the model noise based on the noise propagation is used, which negates the need of extracting noise, simplifies the processes, thereby allowing the processes to be performed at high speed. Note that also in the second embodiment, as with the first embodiment, it is preferred that the noise amount to be added to a blurred image be adjusted according to the imaging sensitivity set through the mode setting dial.

Third Embodiment

Figure 10:
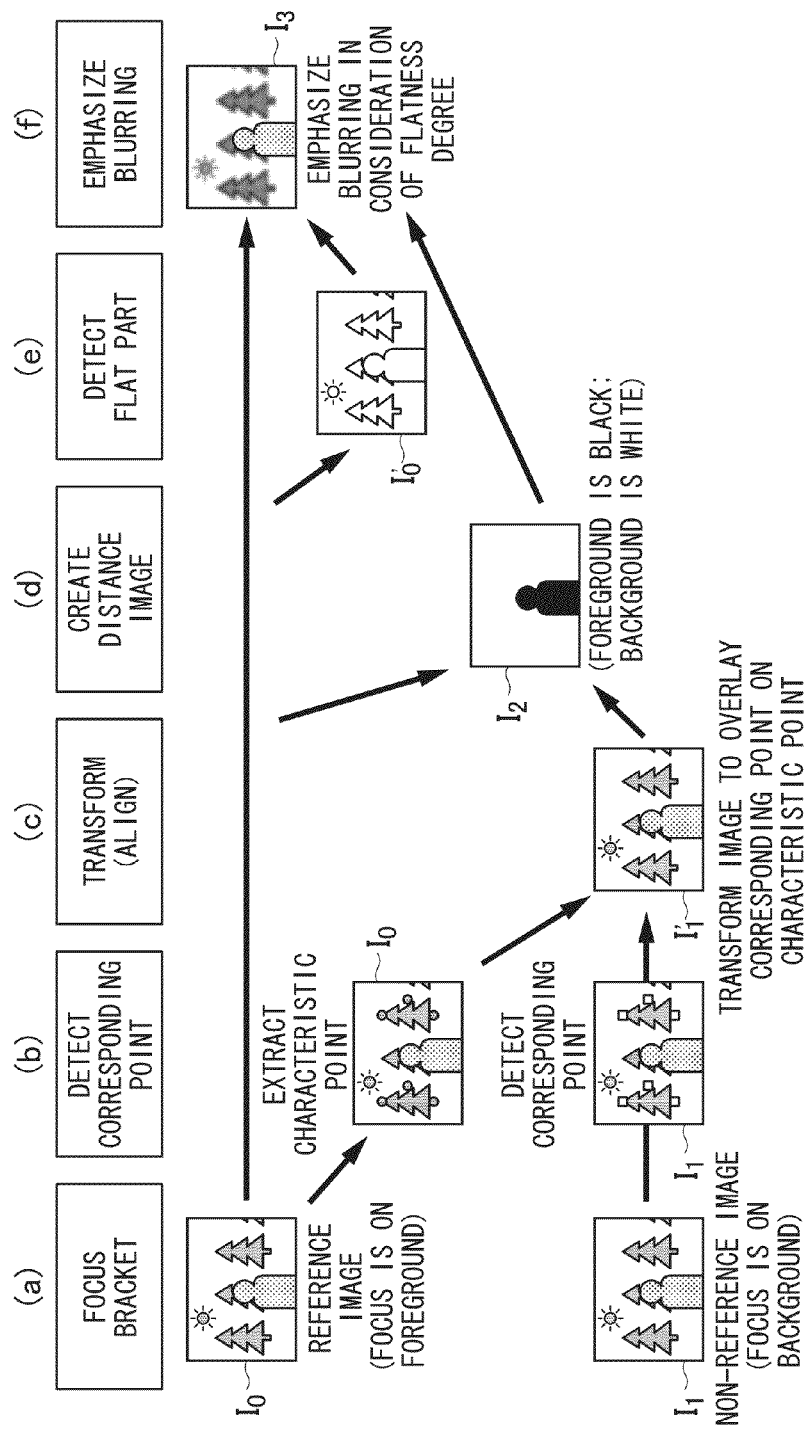
FIG. 10 is a schematic diagram showing an overview of image processing according to a third embodiment of the present invention.
Figure 11:
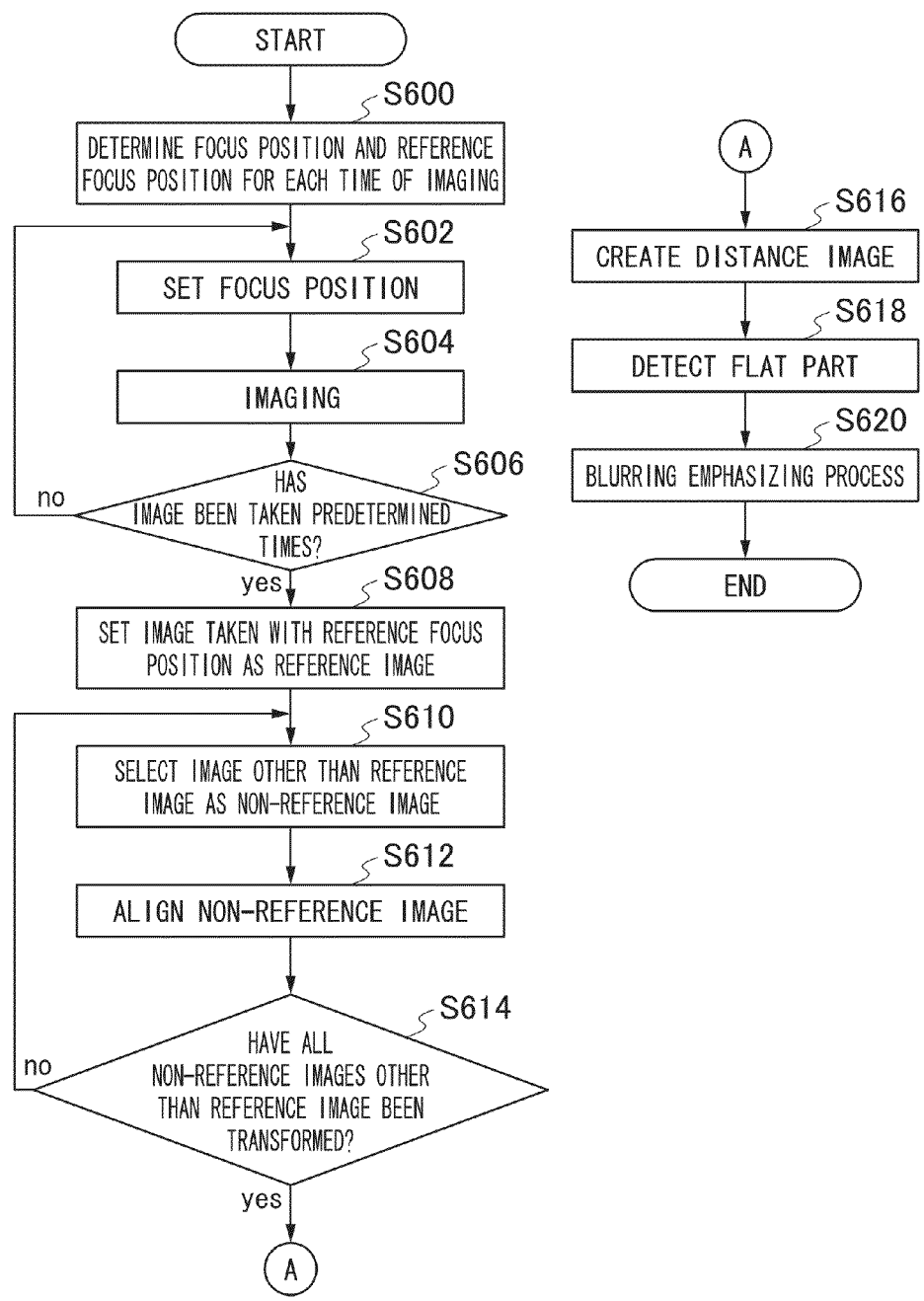
FIG. 11 is a flowchart showing procedures of the image processing according to the third embodiment of the present invention.

Next, image processing according to a third embodiment of the present invention is described. FIG. 10 is a schematic diagram showing the third embodiment of image processing of the present invention. As with the first and second embodiments, a case is considered where a person stands against the background and a blurring process is performed on the background. FIG. 11 is a flowchart showing the image processing procedures in such a case. The focus bracketing process (S600, S602, S604, S606; FIG. 10(A)) and the distance image generating process (S608, S610, S612, S614, S616; FIG. 10(B) to (D)) in the flowchart of FIG. 11 are analogous to the focus bracketing process (S100 to S106) and the distance image generating process (S108 to S116) of the flowchart according to the first embodiment shown in FIG. 3. Accordingly, the detailed description is omitted. Instead, processes specific to the third embodiment, which are flat part detection (S618; FIG. 10(E)) and a blurring emphasis process (S620: FIG. 10(F)) based thereon are described.

The difference in noise amount, which is the problem to be solved by the present invention, is visually prominent particularly in a flat part. Furthermore, irrespective of whether blurring is emphasized or not on a flat part, there is no large difference in appearance. Accordingly, adverse effects on image quality are small. Thus, in the third embodiment, blurring is not emphasized or the degree of blurring emphasis is weaken for a flat part, thereby reducing unevenness of the noise amount at the flat part. Note that in the third embodiment, noise itself is not added, which is different from the image processing methods according to the first and second embodiments. Instead, setting on the blurring amount is changed according to the characteristics of each part of an image. This change adjusts the degree of reduction in noise due to the blurring process, and makes the noise uniform in a resultantly generated blurring-emphasized image.

(1) Flat Part Detection

In S618, a flat part in the reference image is detected. A flat part may be detected by any of various techniques. Here, the degree of a flat part is measured by the variance value Var of a pixel value. An operation window with a prescribed size centered at the significant pixel is provided. The variance Var is calculated on the basis of the pixel values of all the pixels in the window. If the variance is small, the part is a flat part. If the variance is large, the part is an edge part.

(2) Blurring Emphasis Process

In S620, the blurring emphasis process is performed on the basis of the flat part detection result. In the case where a prescribed pixel of the reference image is regarded as a significant pixel, the blurring emphasis strength of the significant pixel determined from a distance image when the flat part detection is not considered is defined as $\sigma 1$. This strength is multiplied by a coefficient $\beta(\text{Var})$ ($\beta=0.0$ to $1.0$) based on the flatness degree (variance Var) of the significant pixel, thus finally calculating a blurring emphasis strength $\sigma 2$. That is, $\sigma 2 = \beta(\text{Var}) \times \sigma 1$.

Figure 12:
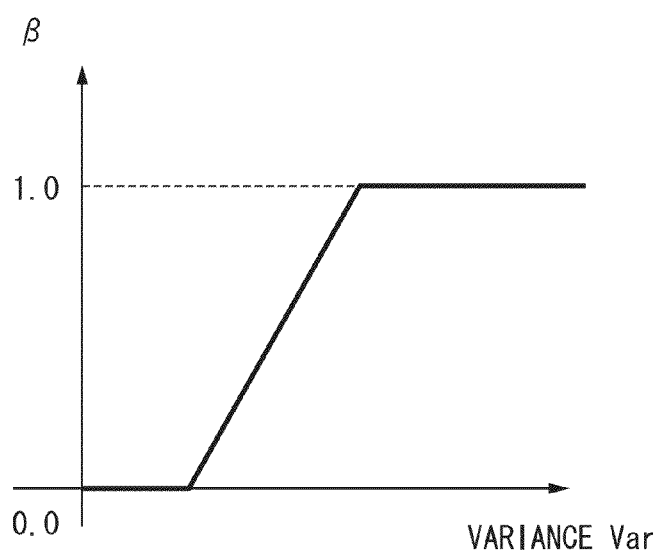
FIG. 12 is a diagram showing a relationship between a flatness degree of a significant pixel and a coefficient for a blurring emphasis strength.

An example of $\beta(\text{Var})$ is shown in FIG. 12. In this example, when the Var is small, i.e., in a flat part, $\beta$ is small and a final blurring emphasis strength $\sigma 2$ is not large. In contrast, when Var is large, i.e., in an edge part, $\beta$ is large and the final blurring emphasis strength $\sigma 2$ is large.

As described above, the image processing method according to the third embodiment sets the blurring amount according to the flatness degree. Accordingly, a blurring-emphasized image with a natural texture having a uniform noise amount can be acquired. Furthermore, noise extraction, estimation and addition as with the first and second embodiments are unnecessary, and the processes are simplified, thereby allowing the processes to be performed at high speed. Note that also in the third embodiment, as with the first and second embodiments, it is preferred to adjust a noise amount to be added to the blurred image according to the imaging sensitivity set through the mode setting dial.

Fourth Embodiment

Figure 13:
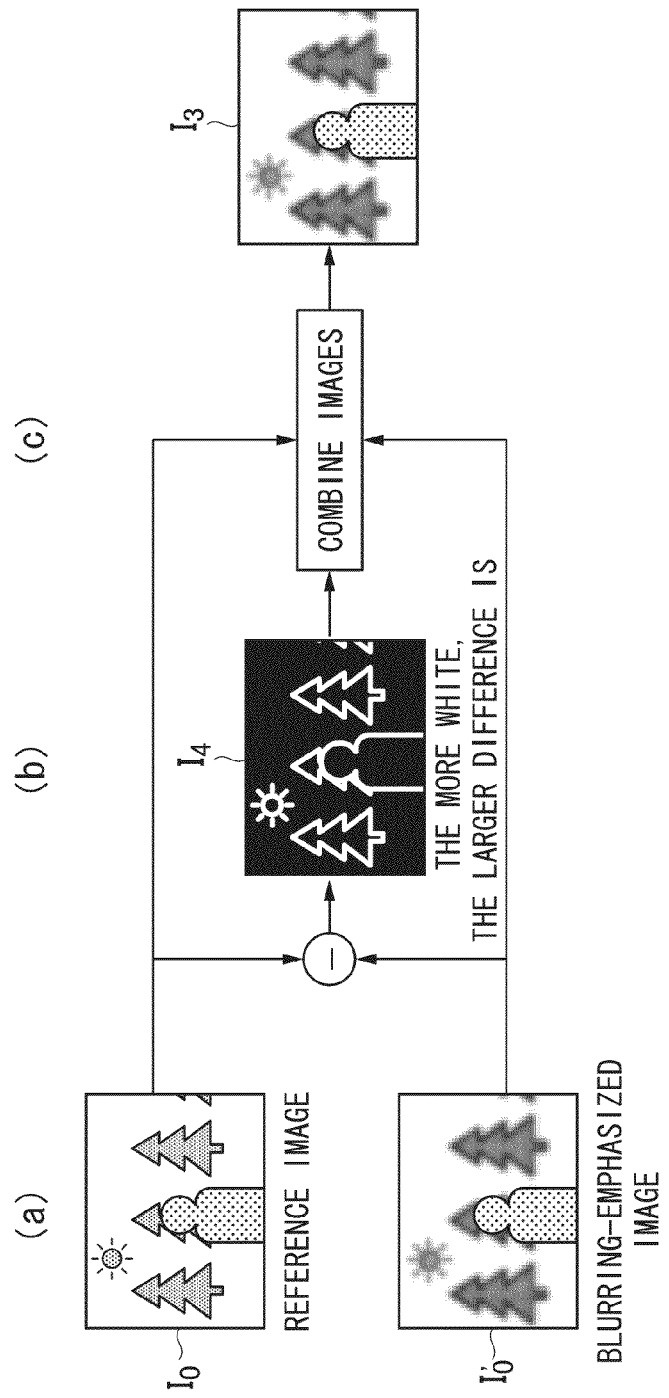
FIG. 13 is a schematic diagram showing an overview of image processing according to a fourth embodiment the present invention.
Figure 14:
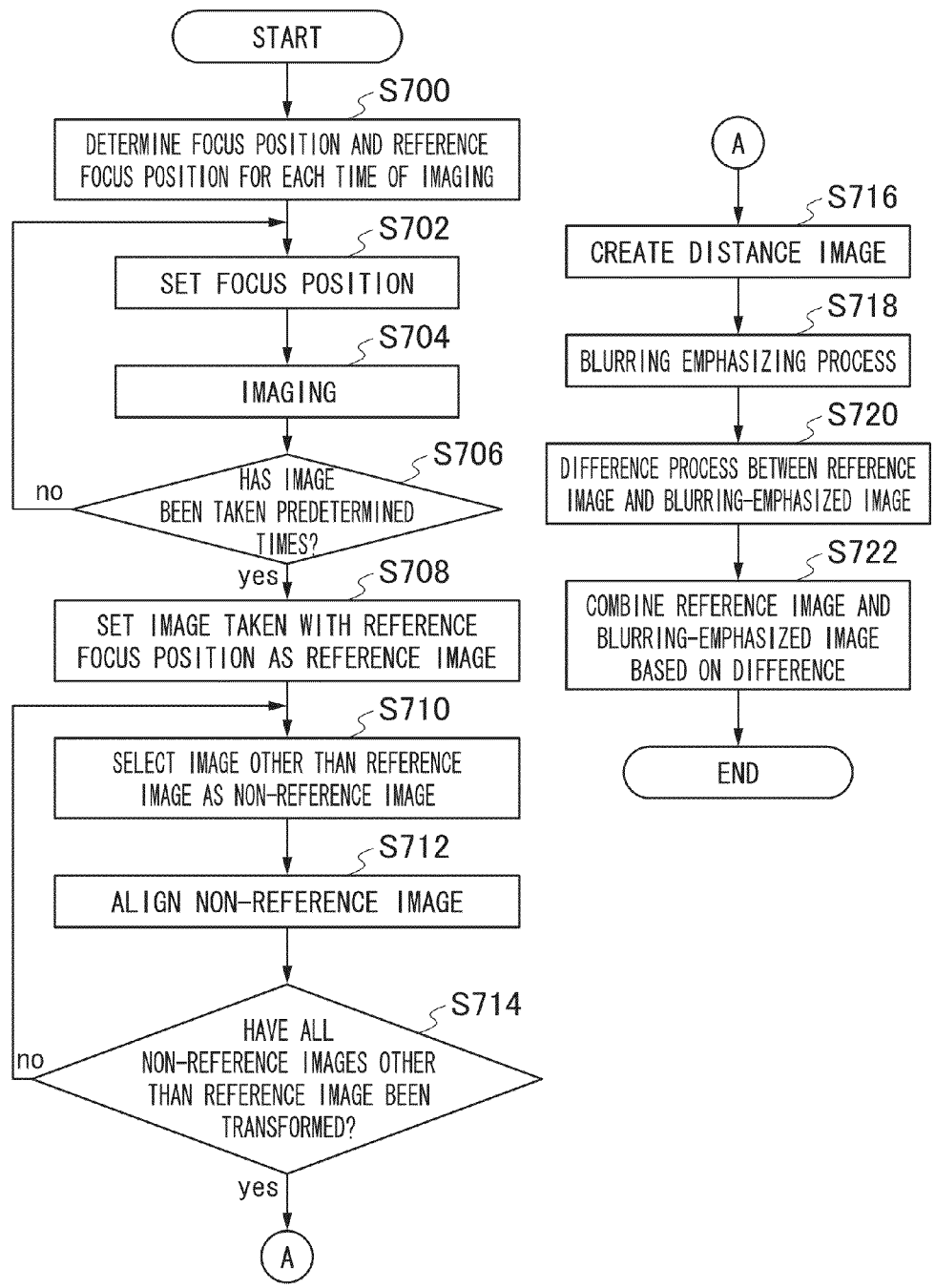
FIG. 14 is a flowchart showing procedures of the image processing according to the fourth embodiment of the present invention.

Next, image processing according to a fourth embodiment of the present invention is described. FIG. 13 is a schematic diagram showing the fourth embodiment of the image processing according to the present invention. As with the first to third embodiments, a case is considered where a person stands against the background and a blurring process is performed on the background. FIG. 14 is a flowchart showing an image processing procedure in such a case. In the flowchart shown in FIG. 14, the focus bracketing process (S700, S702, S704, S706) and the distance image generating process (S708, S710, S712, S714, S716) are analogous to the focus bracketing process (S100 to S106) and the distance image generating process (S108 to S116) of the flowchart according to the first embodiment shown in FIG. 3. Accordingly, the detailed description is omitted. A difference process (S720 in FIG. 11) and an image combining process (S722) based on a difference image, which are specific to the fourth embodiment, are described.

(1) Difference Process

First, in S720, in the reference image $I_0$ and the blurring-emphasized image $I_0'$, the (absolute value of) difference value is calculated for each pixel to acquire a difference image $I_4$. A part where the (absolute value of) difference value is large is a part which has been largely blurring-emphasized by the blurring emphasis process (S718) and where noise is largely reduced. In contrast, a part where the difference value is small is a part which has not been blurring-emphasized or the degree of blurring emphasis has been weak. In addition, the difference value is small also on a flat part. These parts are parts where noise is not reduced so far.

(2) Image Combining Process

Subsequently, in S722, on the basis of a difference value acquired as a result of the difference process in S720, the reference image $I_0$ and the blurring-emphasized image $I_0'$ are combined. The difference of noise amounts is particularly visually prominent at a flat part. Accordingly, it is preferred to perform combination for a flat part while emphasizing the reference image. The characteristics where the difference value is small in a region that is not blurring-emphasized and in a flat part are used, and a blend rate (weight of combination) between the reference image and the blurring-emphasized image is changed for each pixel on the basis of the magnitude of the difference value.

Figure 15:
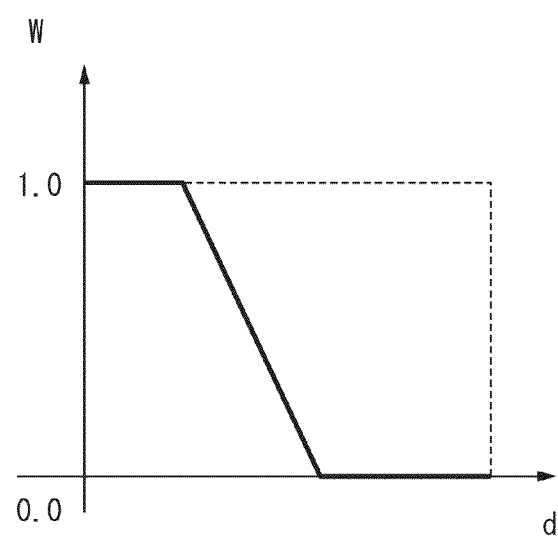
FIG. 15 is a diagram showing a relationship between the difference between a reference image and a blurring-emphasized image and a weighting coefficient for image combination.

Provided that the pixel value of the reference image is defined as p(x, y), the pixel value of the blurring-emphasized image is defined as q(x, y), the difference value is defined as d(x, y), and the pixel value of the combined image is defined as r(x, y), combination is performed to generate a combined image $I_3$ by the following Expression 2.

$$r(x,y) = w(d(x,y)) \times p(x,y) + [1 - w(d(x,y))] \times q(x,y) \quad \text{[Expression 2]}$$

where w(d) is a blend rate (weight) depending on a difference value d. For instance, characteristics as with FIG. 15 can be achieved. In FIG. 15, in an intermediate part of the difference value (a lower right part of the graph), the larger the difference value d is, the smaller the weight w is. In parts other than this part, the value of w is constant irrespective of the value d. Note that the relationship between d and w is not limited to the example of FIG. 15.

The image processing according to the first and second embodiments adds noise to the generated blurring-processed image to thereby uniformize noise. Unlike this processing, the image processing according to this fourth embodiment weights and adds the reference image including a certain amount of noise and the blurred image having reduced noise to thereby uniformize noise in the combined image. Accordingly, the image processing according to the fourth aspect can reduce the difference between noise amounts in blurred parts and the other parts, and create a blurring-emphasized image with a natural texture. Furthermore, the noise extraction, estimation and addition as with the first and second embodiments are unnecessary. The processes are simplified, thereby allowing the processes to be performed at high speed.

Note that also in the fourth embodiment, as with the first to third embodiments, it is preferred that the noise amount to be added to a blurred image be adjusted according to the imaging sensitivity set through the mode setting dial.

The foregoing first to fourth embodiments perform the blurring process, and processes of extracting, estimating and adding noise and the like for each pixel. Alternatively, these processes may be performed in a unit of a region or a unit of each of parts configuring a region or a unit of a pixel block including a plurality of pixels.

Furthermore, it has been described that in the foregoing first to fourth embodiments, the apparatus for performing image processing is the imaging apparatus 10. However, the image processing according to the present invention is not limited to execution by the imaging apparatus. Alternatively, this processing can be performed by a mobile phone with a camera, a personal computer (PC) or the like.

The present invention has been described above using the embodiments. However, the technical scope of the present invention is not limited to a range described in the embodiments. It is apparent for a person skilled in the art that various modifications and improvements can be applied to the embodiments. It is apparent, from the description of claims, that modes subjected to such a modification or an improvement may also be encompassed by the technical scope of the present invention.

The executing order of processes of operation, procedures, steps and stages in the apparatuses, systems, programs and methods that are described in the claims, description and drawings is not specifically identified through use of "before", "subsequently" or the like. It should be noted that implementation may be made according to any order unless an output of a previous process is used in a subsequent process. Even though claims, description and operation flows in the diagrams are described using "first" and "next" for the sake of convenience of description, the description does not mean that execution according to this order is necessary.

What is claimed is:

1. An image processing apparatus, comprising:
a reference image acquisition device which acquires a reference image of a subject;
a blurring amount setting device which sets a blurring amount for the reference image;
a blurred image creating device which applies a blurring process filter to the acquired reference image by the set blurring amount to generate a blurred image, the blurred image being created whose noise is reduced depending on characteristics of the blurring process filter;
a difference calculation device which calculates a difference value between the acquired reference image and the generated blurred image, for the acquired reference image; and
a combined image generation device which weights and adds the reference image and the blurred image, according to the calculated difference value, to generate a combined image.

2. The image processing apparatus according to claim 1,
wherein if the calculated difference value is within a prescribed range,
the combined image generation device sets a weight such that, the smaller the difference value is, the larger the weight on the reference image is and the smaller the weight on the blurred image is, and
sets a weight such that, the larger the difference value is, the smaller the weight on the reference image is and the larger the weight on the blurred image is.

3. The image processing apparatus according to claim 1, further comprising:
a noise amount determination device which determines a noise amount according to imaging sensitivity of the reference image; and
a noise addition device which adds noise of the amount determined according to the imaging sensitivity.

4. The image processing apparatus according to claim 2, further comprising:
a noise amount determination device which determines a noise amount according to imaging sensitivity of the reference image; and
a noise addition device which adds noise of the amount determined according to the imaging sensitivity.

5. An image processing method, comprising:
a reference image acquisition step of acquiring a reference image of a subject;
a blurring amount setting step of setting a blurring amount for the reference image;
a blurred image creating step of applying a blurring process filter to the acquired reference image by the set blurring amount to generate a blurred image, the blurred image being created whose noise is reduced depending on characteristics of the blurring process filter;
a difference calculation step of calculating a difference value between the acquired reference image and the generated blurred image, for the acquired reference image; and
a combined image generation step of weighting and adding the reference image and the blurred image, according to the calculated difference value, to generate a combined image.

6. The image processing method according to claim 5,
wherein if the calculated difference value is within a prescribed range,
the combined image generation step sets a weight such that, the smaller the difference value is, the larger the weight on the reference image is and the smaller the weight on the blurred image is, and
sets a weight such that, the larger the difference value is, the smaller the weight on the reference image is and the larger the weight on the blurred image is.

7. The image processing method according to claim 5, further comprising:
- a noise amount determination step of determining a noise amount according to image sensitivity of the reference image; and
- a noise addition step of adding noise of the amount determined according to the imaging sensitivity.

8. The image processing method according to claim 6, further comprising:
- a noise amount determination step of determining a noise amount according to image sensitivity of the reference image; and
- a noise addition step of adding noise of the amount determined according to the imaging sensitivity.

* * * * *